United States Patent
Kobayashi

(10) Patent No.: US 6,470,165 B2
(45) Date of Patent: Oct. 22, 2002

(54) PROCESS FOR PRODUCING TRANSFER MEMBER, TRANSFER MEMBER, AND IMAGE FORMING APPARATUS

(75) Inventor: Hiroyuki Kobayashi, Fuji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/773,708

(22) Filed: Feb. 2, 2001

(65) Prior Publication Data

US 2001/0042589 A1 Nov. 22, 2001

(30) Foreign Application Priority Data

Feb. 3, 2000 (JP) .......................... 2000-026508

(51) Int. Cl.$^7$ .............................................. G03G 15/16
(52) U.S. Cl. ....................... 399/297; 156/137; 264/408; 399/302; 425/140
(58) Field of Search ................. 399/297, 302, 399/308; 156/137; 244.14; 264/408, 40.1, 40.3; 425/140, 141

(56) References Cited

U.S. PATENT DOCUMENTS

| | | | |
|---|---|---|---|
| 4,243,363 A | * 1/1981 | Mulcahy | 425/140 |
| 5,256,512 A | 10/1993 | Kobayashi et al. | 430/106 |
| 5,552,005 A | 9/1996 | Mammino et al. | 156/157 |
| 5,842,080 A | 11/1998 | Ashibe et al. | 399/49 |
| 6,139,784 A | 10/2000 | Oshima et al. | 264/104 |

FOREIGN PATENT DOCUMENTS

| | | |
|---|---|---|
| JP | 63-301960 | 12/1988 |
| JP | 1-228823 | 9/1989 |
| JP | 3-89357 | 4/1991 |
| JP | 4-255332 | 9/1992 |
| JP | 5-50490 | 2/1993 |
| JP | 5-77252 | 3/1993 |
| JP | 5-269849 | 10/1993 |
| JP | 5-345368 | 12/1993 |
| JP | 6-130830 | * 5/1994 |
| JP | 9-269674 | 10/1997 |
| JP | 11-237795 | * 8/1999 |
| JP | 2000-275980 | * 10/2000 |

* cited by examiner

*Primary Examiner*—Joan Pendegrass
(74) *Attorney, Agent, or Firm*—Fitzpatrick, Cella, Harper & Scinto

(57) ABSTRACT

A process for producing a transfer member to be used in a transfer system in which a toner image formed on a first image-bearing member is transferred to a second image-bearing member includes the steps of melt-extruding an extrusion material from a circular die of an extrusion/forming apparatus into a cylindrical film; and measuring the circumference of the cylindrical film and sending the resultant information to the extrusion/forming apparatus to adjust the circumference of the cylindrical film. A transfer member is produced by such a process, and an image-forming apparatus uses the transfer member. The transfer member can be produced either as an intermediate transfer belt or a transfer belt which has a stable peripheral length.

27 Claims, 5 Drawing Sheets

PROCESS FOR PRODUCING TRANSFER MEMBER, TRANSFER MEMBER, AND IMAGE FORMING APPARATUS

BACKGROUND OF THE INVENTION

1. Field of the Invention

This invention relates to a process for producing a transfer member such as an intermediate transfer belt or a transfer belt, used in electrophotographic apparatus in which a toner image formed on a first image-bearing member is electrostatically transferred to a second image-bearing member to obtain an image, and also relates to a transfer member produced by such a production process, and an image-forming apparatus having the transfer member.

2. Related Background Art

Conventionally proposed are full-color image-forming apparatus having a plurality of recording apparatus in which the surface of at least one photosensitive member is exposed to laser beams light-modulated in accordance with recording information to form electrostatic latent images, which are then developed with toners to form toner images, and the toner images formed by development are transferred to a transfer sheet, where the toner images, having different colors, are superimposingly transferred while the transfer sheet is sequentially transported to the respective recording apparatus by means of a transfer member to form full-color toner images, or the different color toner images are superimposingly transferred onto an intermediate transfer member and the resultant full-color toner images are one time transferred to the transfer sheet.

Full-color image-forming apparatuses making use of a transfer belt as the transfer member are so designed that different color toner images are formed on a plurality of photosensitive members and the toner images formed on the respective photosensitive members are transferred, under registration, to one sheet of transfer material being transported in sequential contact with the photosensitive members, to obtain a full-color image.

The full-color image-forming apparatus making use of a transfer belt have an advantage that, a full-color image is formed through one process because the different color toner images are superimposingly transferred while the transfer material is sequentially transported to the respective recording apparatus, so that the images can be formed in a short time.

Meanwhile, compared with image-forming apparatus in which toner images are transferred from a first image bearing member to a second image bearing member transfer material fastened or attracted onto a transfer drum (e.g., Japanese Patent Application Laid-open No. 63-301960), the full-color image-forming apparatus (electrophotographic apparatus) making use of an intermediate transfer member have an advantage that a variety of second image bearing member transfer materials can be selected without regard to their width and length, including thin paper (40 g/m² paper) and up to thick paper (200 g/m² paper) such as envelopes, post cards and labels. This is because any processing or control (e.g., the transfer material is held with a gripper, attracted, and made to have a curvature) is not required for the second image bearing member transfer material.

Because of such advantages, full-color copying machines and full-color printers making use of transfer members such as transfer belts or intermediate transfer belts have already begun to be available in the market.

The full-color copying machines and printers making use of such transfer members have various advantages as stated above. On the other hand, they also have some subjects for improvement.

One of them is production cost. These transfer members are required to have various properties such as electrical characteristics, dimensional stability, surface properties and mechanical properties, which must each be controlled strictly. Moreover, any portion which causes a great change in properties even in part makes them unusable. In particular, transfer belts are required to have a surface area larger than image-forming regions and are necessarily large in size. Also, in the case of the apparatus having construction where a plurality of photosensitive members are used, the transfer belt or intermediate transfer member is made to have a large peripheral length because a space for disposing the photosensitive members must be ensured, making it necessary to use a much larger belt member. Accordingly, resistance uniformity, dimensional precision of peripheral length, thickness and so forth and mechanical strength which are required in transfer members are demanded to be on much higher levels. Because of these points, the production of belt members involves a high cost.

Also, with regard to durability, some are not necessarily satisfactory. As a result, this may raise the main-body price and running cost of copying machines and printers and also it may take more labor and time for their maintenance.

Meanwhile, in order to form good full-color images, especially in the case of intermediate transfer belts, some other problems must also be solved which may occur because a plurality of different colors are superimposed on the transfer member.

One of them is a misregistration which may occur between individual colors. In fine lines and character images, even a slight color misregistration tends to be conspicuous to provide a possibility of damaging image quality. When the intermediate transfer belt is used, it must be put over a plurality of shafts, where the tension applied to every part of the intermediate transfer belt is not necessarily uniform when driven and rotated. Hence, the intermediate transfer belt tends to undergo local elongation and, concurrently therewith, may cause a delicately uneven rotation. As the result, a delicate color misregistration may appear when colors are superimposed, as so presumed.

Another problem is occurrence of spots around images. In full-color image formation, superimposing different color toners enlarges the quantity of toner per unit area than in the case of monochromatic images. Especially in characters and fine lines, toners are present in a large quantity on narrow lines. Moreover, individual color toners have electric charges with the same polarity, and hence they are electrostatically repulsive to each other. Thus, it can be said that the toners are on the intermediate transfer belt in an unstable state.

Meanwhile, because of a difference in arcs drawn by the outer surface of the intermediate transfer belt and its inner back surface with belt thickness between them, the difference being produced when the belt passes each shaft about which it is put, the intermediate transfer belt elongates in the peripheral direction at its surface and in the vicinity thereof. Hence, the toner images standing unstable and weak to external disturbance as stated above are disordered because of such surface elongation of the intermediate transfer belt when it passes the shafts, so that the spots around line images come to occur, as so presumed.

Still another problem is transfer performance of halftone toner images. Faulty images tend to occur when the intermediate transfer belt has any uneven electrical resistance or uneven wall thickness.

In addition to these, the intermediate transfer belt, which always undergo tension and repeated bending and stretching stress, is required to have a material stiffness high enough not to cause breakage or cracking of the intermediate transfer belt even in its long-term service.

However, in order to satisfy all of these low cost, high durability and high image quality, technical difficulties are involved. Accordingly, studies are being made on transfer members including intermediate transfer belts, having much superior performances.

In the case of transfer belts, though not the case that images are directly transferred onto the belt, they are also required to have properties comparable to those of intermediate transfer belts in respect of cost reduction, electrical characteristics, surface properties, durability and so forth.

At present, various processes for producing belts and tubes used for transfer members are already known in the art. For example, Japanese Patent Application Laid-open No. 3-89357 and No. 5-345368 disclose a process for producing a semiconducting belt by extrusion. Japanese Patent Application Laid-open No. 5-269849 also discloses a process in which a belt is obtained by joining both ends of a sheet to bring it into a cylindrical form. Japanese Patent Application Laid-open No. 9-269674 still also discloses a process in which a belt is obtained by forming a multi-layer coating film on a cylindrical substrate and finally removing the substrate. Meanwhile, Japanese Patent Application Laid-open No. 5-77252 discloses a seamless belt obtained by centrifugal molding.

The above processes each have merits and demerits. For example, in the extrusion, setting the die gap of an extruder die in the same size as the desired belt thickness involves considerable difficulties for producing thin-layer belts that can achieve the cost reduction and can make the spots around line images occur less frequently, tending to cause uneven wall thickness and uneven electrical resistance affected by such thickness. In the case when both ends of a sheet are joined, the difference in height and decrease in tensile strength at the joint come into question. Still also, processes making use of solvents as in cast molding, coating and centrifugal molding require many steps of preparing a coating solution, coating it and removing the solvent, resulting in a high cost.

As a process for producing an endless belt which is thin-gauge and has no fold, Japanese Patent Applications Laid-open No.1-228823 and No. 4-255332 disclose a process in which an extruded tube is brought into contact with a cooling mandrel so provided as to be held inside the extruded tube, its size is adjusted there, and, after it has been hardened, it is held between nip rolls also disposed inside and outside the tube and then taken off while it is kept tubular. Japanese Patent Application Laid-open No. 5-50490 also discloses a production process in which a sizing sleeve is provided on the outside of a tubular film.

In these processes, however, a size adjustment mechanism attached to the production apparatus comes into contact with an extruded product to adjust the size, and hence a problem may arise such that no smooth extrusion can be carried out in the case of resins having a large coefficient of friction or resins having a high melting temperature which may harden rapidly. Hence, tough materials commonly having high modulus of elasticity and breaking strength tend to obstruct the improvement in strength of the belt because of their high melting temperature.

In the process in which the size is adjusted in contact with the tube surface, the surface of the belt produced is also finely scratched to undesirably adversely affect image characteristics in some cases. Also, in these processes, it is difficult to obtain extruded products greatly larger than circular dies, and is difficult to take any means for sufficiently drawing an extruded product in the direction perpendicular to the direction of extrusion to improve the strength of the extruded product.

In addition, when the size of a product is changed, it is necessary to remake the size adjustment mechanism of course and even the circular die, to bring about various problems of, e.g., equipment cost increase, which causes a raise of product price.

SUMMARY OF THE INVENTION

Accordingly, the present inventors propose a process for producing a novel transfer member that is different from any conventional ones, having solved the above problems, and to provide a transfer member obtained by the process and an image-forming apparatus having the transfer member.

An object of the present invention is to provide a process for producing a transfer member at a lower cost, in a smaller number of steps and in a rich variety of forms.

Another object of the present invention is to provide a process for producing a transfer member which can be free of any changes in its size and characteristics and can maintain characteristics at the same level as those at the initial stage even when used repeatedly to make severe running service.

Still another object of the present invention is to provide a process for producing a transfer member which can contribute to the formation of good full-color images having less color misregistration and less spots around line images.

A further object of the present invention is to provide a process for producing a transfer member having a superior dimensional precision of thickness, peripheral length and so forth of belts.

A still further object of the present invention is to provide a transfer member obtained by the above production process, and an image-forming apparatus having the transfer member.

That is, the present invention provides a process for producing a transfer member to be used in a transfer system by which a toner image formed on a first image-bearing member is transferred to a second image-bearing member; the process comprising the steps of;

melt-extruding an extrusion material from a circular die of an extrusion/forming apparatus into a cylindrical film; and measuring the circumference of the cylindrical film and sending the resultant information to the extrusion/forming apparatus to adjust the circumference of the cylindrical film.

The present invention also provides a transfer member to be used in a transfer system by which a toner image formed on a first image-bearing member is transferred to a second image-bearing member; the transfer member comprising a cylindrical film obtained by;

melt-extruding an extrusion material from a circular die of an extrusion/forming apparatus into a cylindrical film; and measuring the circumference of the cylindrical film and sending the resultant information to the extrusion/forming apparatus to adjust the circumference of the cylindrical film.

The present invention still also provides an image-forming apparatus having the above transfer member.

DESCRIPTION OF THE PREFERRED EMBODIMENTS

The transfer member of the present invention is one used in a transfer system by which a toner image formed on a first image-bearing member is transferred to a second image-bearing member, and has a cylindrical film obtained by melt-extruding an extrusion material from a circular die of an extrusion/forming apparatus into a cylindrical film, measuring the circumference of the cylindrical film, and sending the resultant information to the extrusion/forming apparatus to adjust the circumference of the cylindrical film.

An embodiment of the process for producing the transfer member of the present invention used as a transfer belt or an intermediate transfer belt is described below. This embodiment by no means limits the present invention.

Figure 3:
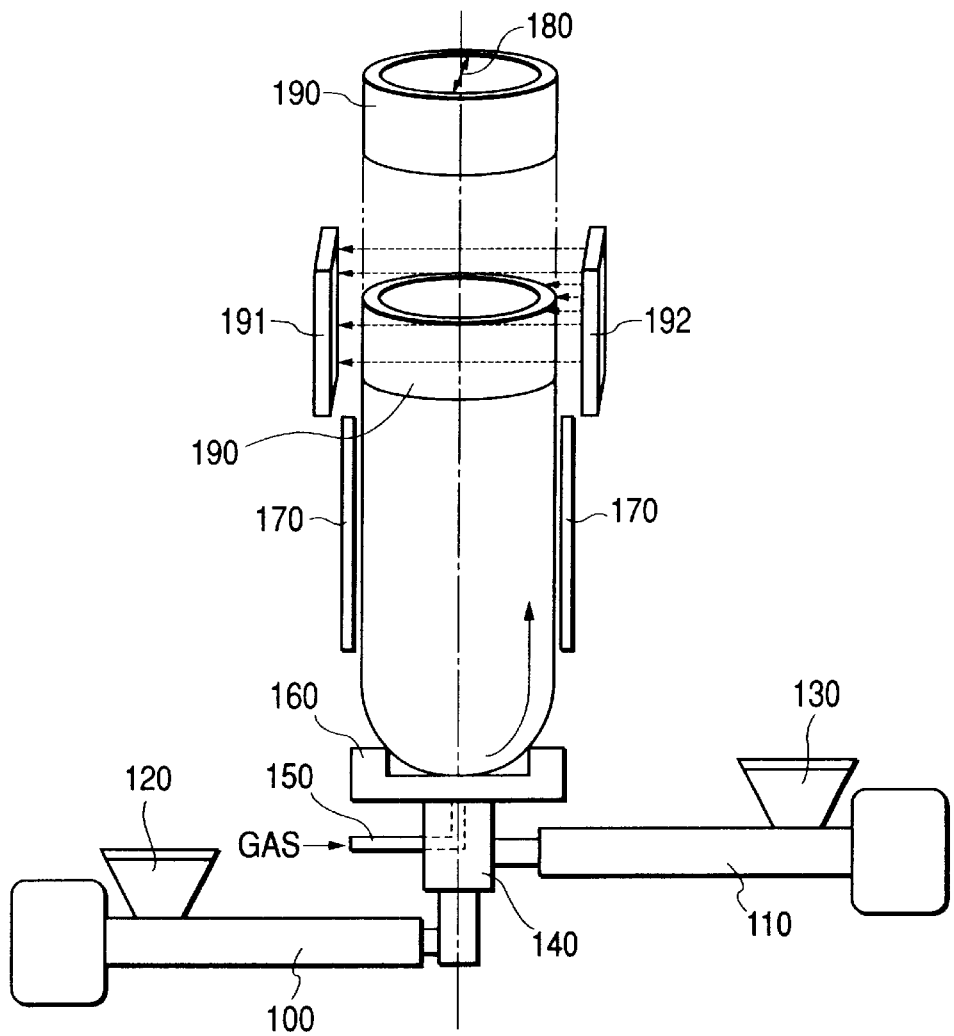
FIG. 3 schematically illustrates an extrusion/forming apparatus according to the present invention.
Figure 4:
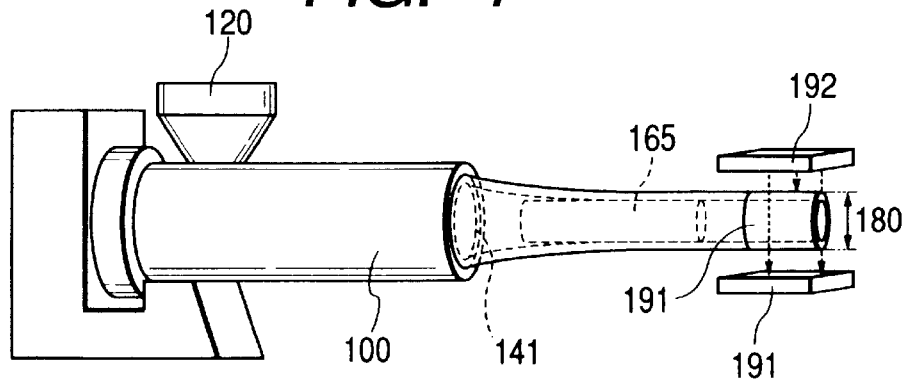
FIG. 4 schematically illustrates an extrusion/forming apparatus for producing another transfer member according to the present invention.

FIGS. 3 and 4 show extrusion/forming apparatus used in the present invention. These apparatus each consist basically of an extruder and a circular die.

The extrusion/forming apparatus shown in FIG. 3 has two extruders 100 and 110 so that a belt of double-layer construction can be extruded. In the present invention, however, at least one extruder may be provided. A single-layer transfer member can be produced by a process described below.

First, an extrusion resin and optionally a conducting agent and additives are premixed under the desired formulation and thereafter kneaded and dispersed to prepare an extrusion material, which is then put into a hopper 120 installed in the extruder 100. The extruder 100 has a preset temperature, extruder screw construction and so forth which have been so selected that the extrusion material may have a melt viscosity necessary for enabling the extrusion into an endless belt in the later step and also the materials constituting the extrusion material can be dispersed uniformly.

Then, the extrusion material is melt-kneaded in the extruder 100 into a melt, which then enters a circular die 140, and is extruded therefrom. The circular die 140 is provided with a gas inlet passage 150. Through the gas inlet passage 150, a gas is blown into the circular die 140, whereupon the melt having passed through the circular die 140 in a cylindrical form inflates while scaling up in the diametrical direction. The gas to be blown here may include air, and besides nitrogen, carbon dioxide and argon.

The extruded product having been thus inflated is drawn upward while being cooled by a cooling ring 160. At this stage, the extruded product passes through the space defined by a dimension stabilizing guide 170, so that its final shape dimension 180 is determined. This product is further cut in a desired width, thus a transfer member 190 can be obtained.

In the case when the transfer member of double-layer construction is produced, an extruder 110 and a hopper 130 are further provided. Simultaneously with the kneaded melt in the extruder 100, a kneaded melt in the extruder 110 is sent to a double-layer circular die 140, and the two layers are simultaneously extruded and then scale-up inflated. In the case of triple- or more layers, the extruder and the circular die may be provided in the number corresponding to the number of layers.

Figure 5:
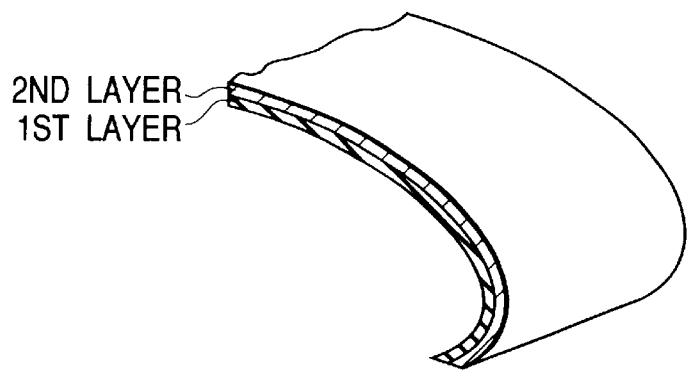
FIG. 5 cross-sectionally illustrates part of an intermediate transfer belt having a double-layer construction.
Figure 6:
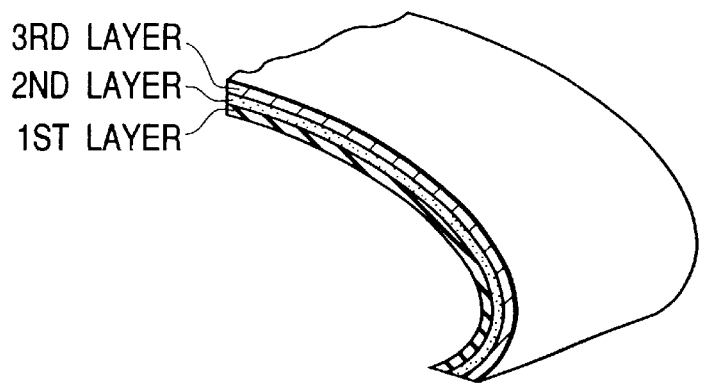
FIG. 6 cross-sectionally illustrates part of an intermediate transfer belt having a triple-layer construction.
Figure 7:
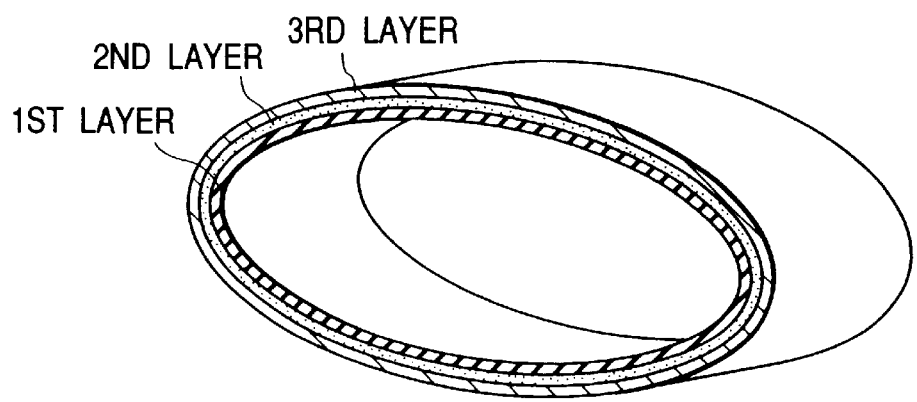
FIG. 7 cross-sectionally illustrates the whole of the intermediate transfer belt having a triple-layer construction.

Examples of an intermediate transfer belt of double-layer construction and that of triple-layer construction are shown in FIGS. 5 to 7. Thus, the present invention makes it possible to extrude not only transfer belts and intermediate transfer belts of single-layer construction but also those of multi-layer construction in a good dimensional precision through one step and also in a short time. The fact that the extrusion can be made in a short time well suggests that mass production and low-cost production can be made.

FIG. 4 shows another transfer member production process. The extrusion material put into a hopper 120 is made into a uniformly dispersed melt in the course as it passes through an extruder 100, which is then extruded from a circular die 141. The belt thus extruded is cooled in the state its inner surface comes into contact, or noncontact, with an internal cooling mandrel 165, and is thus regulated to have a desired shape dimension 180 to obtain a transfer member 190.

In the present invention, the transfer member (belt) may preferably be obtained in a prescribed extrusion/forming ratio. The extrusion/forming ratio is meant to be the ratio of the external diameter corresponding to shape dimension 180 after extrusion/forming to the external diameter of the circular die 140, i.e., (extrusion/forming ratio)=(belt external diameter after extrusion/forming)/(external diameter of extruder circular die).

In the present invention, the extrusion/forming ratio may preferably be from 0.5 to 3.0. To find the external diameter of the belt after extrusion/forming, the belt may be cut and its length in the peripheral direction may be measured with a vernier caliper.

The melt may preferably be extruded from the circular die at an ejection rate of from 1 to 20 m/min. If it is extruded at an ejection rate lower than 1 m/min, the belt tends to have an unstable peripheral length, and, at an ejection rate higher than 20 m/min, the belt tends to have a greatly uneven wall thickness.

In the present invention, the peripheral length (circumference) of the transfer member is an aspect especially important for maintaining good images and image quality.

The transfer member is required to have a peripheral-length precision error within ±0.8 mm based on the intended size, and, when a higher quality is required, within ±0.5 mm.

If a belt having a peripheral length which is uneven beyond this peripheral-length precision error, the following difficulties may occur.

(1) When it has an error greater than ±1.5 mm, the belt can not be attached to a belt drive unit over which the belt is put and rotated. More specifically, since belt drive units installed in most electrophotographic apparatus are so designed as to be as simple as possible in order to make them low-cost and small-size, they have not so high a degree of freedom as to tolerate any excess unevenness of the belt peripheral length. Hence, a too long belt may become loose where it is passed about, so that it can not rotate smoothly. Also, a too short belt can not be put over in the first place.

(2) As long as the belt has the error within the range of from ±0.8 mm to ±1.5 mm, it can be put over the belt drive unit for the time being and can be rotated. Since the belt is so designed as to rotate once for a given time, any belt outside that range may cause a difference in peripheral speed of the belt, deviating the timing of development and transfer. This may remotely cause faulty transfer or delicate color misregistration or may move to one side due to the difference in peripheral speed, and, in an extreme case, may cause machine stoppage due to sequence disorder caused by the discrepancy in transfer timing.

(3) As long as the error is within ±0.8 mm, the color misregistration can be kept within 150 μm between colors. However, in order to keep the color misregistration within 100 μm, the error in peripheral-length precision of the belt must be kept within ±0.5 mm at least, and preferably within ±0.2 mm.

A difference in peripheral length between right and left open edges of the belt is also a factor which can not be ignored, and may preferably be 1.5 mm or smaller, and particularly 0.5 or smaller. If the difference in right-and-left peripheral length is greater than 1.5 mm, the belt may have a problem on its travel performance to tend to move to one side or to meander. Especially in the case of the transfer belt, the belt tends to have a large peripheral length, and hence tends to be affected more by such a difference. Thus, the belt is required to have an equality in right-and-left peripheral length with a higher precision.

Accordingly, the present inventors have discovered a method that can provide a belt which can maintain the equality in right-and-left peripheral length in a higher precision in one belt and also can have a small difference in right-and-left peripheral length and a small error in peripheral-length precision, and have accomplished the present invention.

Figure 8:
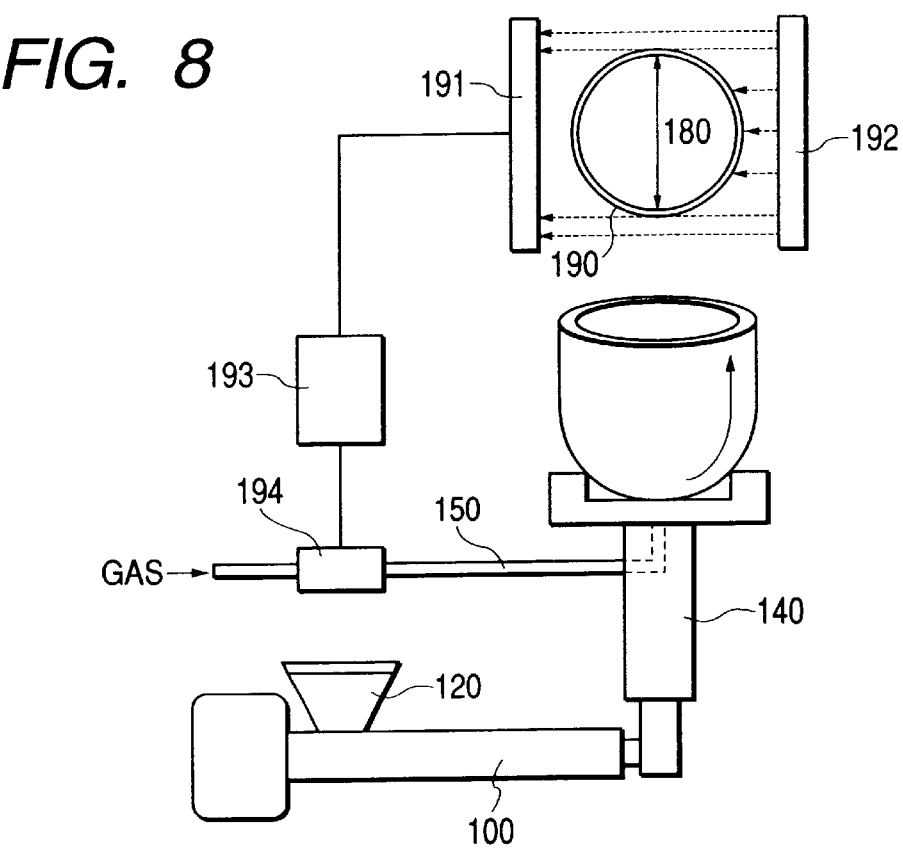
FIG. 8 schematically illustrates the extrusion/forming apparatus shown in FIG. 3.

According to the present invention, in order to attain the peripheral length in a good precision, the peripheral length is measured in the course of forming a cylinder as shown in FIGS. 3 and 8, and the information obtained is every time given to the extrusion/forming apparatus. In accordance with this information, extrusion/forming conditions are appropriately adjusted to desirable conditions so that an always constant peripheral length can be attained. An embodiment of the present invention is described below with reference to FIGS. 3 and 8. The present invention is by no means limited to this embodiment. Any embodiments are possible without dependence on this embodiment as long as the subject-matter features of the present invention are secured, and such embodiments are embraced in the present invention.

As shown in FIGS. 3 and 8, a light-projecting part 192 and a light-receiving part 191 are disposed at the position of the belt where its final dimension is determined in the step of cylindrical extrusion/forming. From this light-projecting part 192, light is applied to the belt 190 in a width not smaller than the diameter of the belt. The light thus applied is screened in a width corresponding to the diameter of the belt 190. A shadow caused by a screen, which is proportional to the size of peripheral length, is produced on the light-receiving part 191, and the size of this shadow is measured to find the diameter of the belt, from which the peripheral length of the belt 190 is calculated.

As the light applied here, usable are ultraviolet light, visible light, infrared light, laser light and the like. From the viewpoint of straight-line travel and interference of light, laser light is preferred. In particular, visible semiconductor laser light is particularly preferred because light and shade can be distinguished by color. This visible semiconductor laser light is emitted toward the light-receiving part 191 as parallel light controlled by a projecting lens provided in the light-projecting part 192.

In the light-receiving part 191, for example a one-dimensional CCD image sensor is incorporated, and scanning arithmetic operation is made at about 500 to 2,000 revolutions per second to measure the diameter of the belt 190. The information obtained is, as shown in FIG. 8, sent to a gas control unit 194 via a processor 193 to control the gas to be fed. The gas control unit 194 is optionally provided with a valve, a pump and so forth which are quickly operable in order that, in accordance with the information given thereto, one or both of the quantity and pressure of the gas to be fed can be controlled precisely and without causing time discrepancy as far as possible.

The gas control unit 194, when it receives information "short" upon calculation of the peripheral length of the belt 190, makes an adjustment so as to feed the gas in a larger quantity or/and to raise gas pressure. When conversely it receives information long", it controls the gas so as to make the diameter smaller. This control may be made many times in the course of extrusion/forming to find the peripheral length in a better precision. Taking account of apparatus cost, it may be made in the range of from once per 30 seconds to once per five minutes, whereby the error can be kept within ±0.5 mm, as stated previously.

In the apparatus shown in FIG. 4, the information on peripheral length which is obtained in the same manner as in the apparatus shown in FIGS. 3 and 8 may be reflected on kneading conditions, e.g., kneading speed, the number of revolutions for kneading and the quantity of materials to be fed, to make adjustment of the peripheral length.

In the present invention, like the maintenance of strict dimensional precision, the uniformity of electrical resistance value at the surface of the transfer member and electrical resistance value in the interior thereof is a very important factor in order to maintain the performance of the transfer member, in particular, the intermediate transfer belt and the transfer belt. For example, if the surface of the intermediate transfer belt has a too high electrical resistance, it is difficult to provide a sufficient transfer electric field at the time of primary transfer and at the time of secondary transfer, tending to result in faulty transfer. If on the other hand it has a too low electrical resistance, electrical discharge may locally occur, also making it hard to form a good transfer electric field. Also, if the interior of the belt has a nonuniform electrical resistance, the local electrical discharge, i.e., leakage may occur like the foregoing, so that electric currents applied at the time of primary transfer and at the time of secondary transfer may escape therefrom to make it hard to provide the necessary transfer electric field.

Accordingly, in the present invention, one or both of the volume resistance and surface resistance in the peripheral direction of the transfer member, the transfer belt or intermediate transfer belt, may preferably be so controlled that its/their maximum value is within 100 times its/their minimum value. In order to achieve these, it is preferable, in addition to the use of the production process of the present invention, to study in detail the compatibility of an extrusion material resin with a resistance control agent, the quantity of the resistance control agent, the process conditions at the time of dispersion and also the process conditions at the time of the belt production shown in FIGS. 3, 4 and 8.

The volume resistance and surface resistance in the present invention indicate not only a difference in conditions of measurement but also quite different electrical characteristics. More specifically, when voltage and electric current to be applied to the intermediate transfer belt are applied in the thickness direction, the movement of electric charges of the belt is determined by physical properties of the internal structure, in other words, the layer construction of the belt and the types and dispersion state of additives and resistance control agents therein. As a result, the surface potential, charge elimination rate and so forth of the belt are determined. On the other hand, when the voltage and current are so applied that electric charges are given and received only on the surface of the endless belt, charging and charge eliminating characteristics are determined only depending on the proportion of presence of additives or resistance control agents on the surface, almost without depending on the endless belt internal structure.

In the present invention, however, these two resistances are brought into preferable ranges, where it is easy to maintain transfer efficiency and to achieve uniform transfer performance of the intermediate transfer belt and a high image quality without causing neither blank areas caused by poor transfer nor filming.

On the whole transfer member in the present invention, the transfer member may preferably have a volume resistivity of from $10^0$ to $10^{14}$ Ω·cm and a surface resistivity of from $10^0$ to $10^{17}$ Ω/square. In order to prevent leakage and faulty transfer stated above and also any local uneven transfer, the difference in electrical resistance at every portion of the transfer member may preferably be within 100 times for both the surface resistance and the volume resistance.

The surface resistance and volume resistance in the present invention are measured in the following way.

Measuring Instrument

Resistance meter: Ultra-high resistance meter R8340A (manufactured by Advantest Co.)

Sample box: Sample box TR42 for ultra-high resistance measurement (manufactured by Advantest Co.)

Here, the main electrode is 25 mm in diameter, and the guard-ring electrode is set to be 41 mm in inner diameter and 49 mm in outer diameter.

Sample

The transfer member is cut in a circle of 56 mm in diameter. After cutting, it is provided, on its one side, with an electrode over the whole surface by forming a Pt-Pd deposited film and, on the other side, provided with a main electrode of 25 mm in diameter and a guard electrode of 38 mm in inner diameter and 50 mm in outer diameter by forming Pt-Pd deposited films. The Pt-Pd deposited films are formed by carrying out vacuum deposition for 2 minutes using Mild Sputter E1030 (manufactured by Hitachi Ltd.). The one on which the vacuum deposition has been carried out is used as the sample.

Measurement Conditions

Measurement atmosphere: 23° C., 55% humidity. (The measuring sample is previously kept left in an atmosphere of 23° C. and 55% humidity for 12 hours or longer.)

Measurement mode: Program mode 5 (discharge for 10 seconds, charge and measurement for 30 seconds)

Applied voltage: 1 to 1,000 V

The applied voltage may arbitrarily be selected within the range of from 1 to 1,000 V which is part of the range of the voltage applied to the intermediate transfer member used in the image-forming apparatus of the present invention. Also, the applied voltage used may appropriately be changed within the above range of applied voltage in accordance with the resistance value, thickness and breakdown strength of the sample. Also, as long as the volume resistance and surface resistance at a plurality of spots, measured at any one-point voltage of the above applied voltage, are included in the resistance range of the present invention, they are judged to be within the resistance range intended in the present invention.

To achieve such values of electrical resistance, in the present invention, the resistance control agent may preferably be in an amount not more than 40% by weight, more preferably not more than 25% by weight, and particularly preferably not more than 21% by weight, based on the total weight of the layer containing the resistance control agent. Especially when an ion-conducting resistance control agent and an electron-conducting resistance control agent are each used alone or in combination, the ion-conducting resistance control agent has a superior dispersibility but on the other hand has a great moisture dependence, and hence it is not preferred to be used in a large quantity. Also, the electron-conducting resistance control agent may greatly affect the uniformity of electrical resistance in the transfer member production process of the present invention as stated previously. Accordingly, in the present invention, the ion-conducting resistance control agent and the electron-conducting resistance control agent may preferably be used alone or in combination in an amount of from 0.05 to 10% by weight and in an amount of from 3 to 30% by weight, respectively.

In the production process of the present invention, the uniformity of electrical resistance in the belt also tends to be greatly affected by the magnitudes of extrusion/forming ratio. In the present invention, the extrusion material may preferably be extruded in an extrusion/forming ratio of from 0.5 to 3.0. If the extrusion/forming ratio is more than 3.0, the extruded product may inflate at a too large scale-up percentage in the step of scale-up inflation after it has passed through the circular die, causing uneven electrical resistance in the draw-up direction (axial direction) and the peripheral direction. In particular, since the extruded product is instantaneously greatly scaled up in the peripheral direction, it tends to have uneven peripheral length and may have a great uneven electrical resistance in the peripheral direction. Accordingly, the extrusion/forming ratio may more preferably be controlled to be 2.8 or less to obtain good results. If it is less than 0.5, stable extrusion/forming may be carried out with difficulty.

In the case when the gas is blown, the extrusion/forming ratio may preferably be from 1.05 to 3.0. If the extrusion/forming ratio is less than 1.05, it may delicately be difficult to balance the rate of extrusion and the quantity and rate of gas blowing, tending to cause unstable peripheral length and dimensions of the belt and unevenness of the belt in its wall thickness direction. Uneven belt wall thickness is disadvantageous to the uniformity of electrical resistance in the belt. Where the extrusion should be carried out in an extrusion/forming ratio less than 1.05, it is necessary to use the extrusion/forming apparatus as shown in FIG. 4.

In the present invention, the extrusion material may preferably have a water absorption of 1.9% or less. If it has a water absorption more than 1.9%, bubbles or granular structure containing water vapor tend to occur on the belt surface at the time of transfer member extrusion, and hence it may preferably have the water absorption of 1.9% or less. Especially when the extruded material is scale-up inflated in an extrusion/forming ratio more than 1.0 so as to obtain a proper size, the water absorption may preferably be controlled to be 1.6% or less. Also, the resultant transfer member may preferably have a water absorption maintained at 1.9% or less. If it has a water absorption maintained more than 1.9%, the transfer member tends to have a great difference in electrical resistance between low-temperature and low-humidity environment and high-temperature and high-humidity environment, making it difficult to stabilize transfer efficiency in every environment.

The water absorption is measured according to JIS-K7209, Method A. The sample may have the shape of particles, a film, a thin plate or a cube, any of which may appropriately selected within the range where reproducibility can be ensured in measurements.

The transfer member after extrusion/forming may preferably have a wall thickness in the range of from 45 to 300 $\mu$m, particularly from 50 to 270 $\mu$m, and more preferably from 55 to 260 $\mu$m. This is because, in the production process shown in FIG. 3, the kneaded melt extruded in a tubular form from the circular die inflates while scaling up abruptly, and hence the wall thickness of the extruded product may preferably be restricted to a certain extent also from the viewpoint of the controllability of electrical resistance.

In a wall thickness larger than 300 $\mu$m, uniform scale-up inflation may be made with difficulty tending to cause a difficulty in the uniformity of electrical resistance, and tending to make it difficult to attain uniform wall thickness. Also, when an endless belt having such a large wall thickness is used as the intermediate transfer member or the transfer belt, it may smoothly travel with difficulty because of fairly high rigidity and poor flexibility, tending to cause deflection or to move to one side during the travel of the belt. In a wall thickness smaller than 45 $\mu$m, problems tend to occur such that, the belt itself may have a low tensile strength, and the belt becomes loose to cause elongation gradually while the belt is put over and rotated for repeated use. Also, according to the production process of the present invention, it is possible to deal with the production of a belt of smaller than 45 $\mu$m in thickness because a stable electrical resistance can be expected on account of its thin layer. However, such a wall thickness is not preferred because of the above-mentioned practical problems.

The transfer member may also have a scattering of wall thickness within ±13% of average wall thickness, preferably within ±10% of average wall thickness, and, in order to minimize the scattering of electrical resistance, within ±7% of average wall thickness.

In the present invention, the final transfer member 190 may preferably have a wall thickness smaller than the die gap size of the circular die shown in FIGS. 3, 4 and 8. This is to attain surface smoothness of the transfer member and to ensure the uniformity in thickness, at the time of extrusion. The wall thickness may be in the range of from 99/100 to 1/100 with respect to the die gap of the circular die. If it is less than 1/100, a high extrusion pressure may result to tend to make it difficult to carry out smooth extrusion.

The resin (extrusion resin) used as a material for the transfer member of the present invention may include, e.g., styrene resins (homopolymers or copolymers containing styrene or substituted styrene) such as polystyrene, polychlorostyrene, poly-α-methylstyrene, styrene-butadiene copolymer, styrene-vinyl chloride copolymer, styrene-vinyl acetate copolymer, styrene-maleic acid copolymer, styrene-acrylate copolymers (such as styrene-methyl acrylate copolymer, styrene-ethyl acrylate copolymer, styrene-butyl acrylate copolymer, styrene-octyl acrylate copolymer and styrene-phenyl acrylate copolymer), styrene-methacrylate copolymers (such as styrene-methyl methacrylate copolymer, styrene-ethyl methacrylate copolymer and styrene-phenyl methacrylate copolymer), styrene-α-methyl chloroacrylate copolymer and styrene-acrylonitrile-acrylate copolymer; and methyl methacrylate resin, butyl methacrylate resin, ethyl acrylate resin, butyl acrylate resin, modified acrylic resins (such as silicone-modified acrylic resin, vinyl chloride resin modified acrylic resin and acryl-urethane resin), vinyl chloride resin, styrene-vinyl acetate copolymer, vinyl chloride-vinyl acetate copolymer, rosin-modified maleic acid resins, phenolic resins, epoxy resins, polyester resins, polyester polyurethane resins, polyethylene resins, polypropylene resins, polybutadiene resins, polyvinylidene chloride resins, ionomer resins, polyurethane resins, silicone resins, fluorine resins, ketone resins, ethylene-ethylacrylate copolymer, xylene resins, polyvinyl butyral resins, polyimide resins, polyamide resins, modified polyphenylene oxide resins, polyarylate resins, polyamide-imide resins, polyether-imide resins, polyether ether ketone resins, polysulfone resins, polyether sulfone resins, polycarbonate resins, polyphenylene sulfide resins, polyethylene terephthalate resins, polybutylene terephthalate resins, modified polyphenylene ether resins and polybenzimidazole resins. Any one type selected from the group consisting of these may be used alone or two or more types of these may be used in combination. Examples are by no means limited to the foregoing materials.

The transfer member of the present invention must have a hardness in an extent that may cause none of faulty transfer and blank areas caused by poor transfer. The hardness may preferably be in the range of from 60° to 100°, more preferably from 70° to 100°, and still more preferably from 73° to 100°. It is measured according to the method prescribed in JIS-A.

Then, among the resistance control agents for adjusting the values of electrical resistance of the transfer member of the present invention, the electron-conducting resistance control agent may include, e.g., carbon black, graphite, aluminum-doped zinc oxide, tin-oxide-coated titanium oxide, tin oxide, tin-oxide-coated barium sulfate, potassium titanate, aluminum metal powder and nickel metal powder. The ion-conducting resistance control agent may include, e.g., tetraalkylammonium salts, trialkylbenzyl ammonium salts, alkyl sulfonates, alkylbenzene sulfonates, alkyl sulfates, glycerol fatty acid esters, sorbitan fatty acid esters, polyoxyethylene alkylamines, polyoxyethylene fatty alcohol esters, alkylbetaines and lithium perchlorate.

In particular, in the present invention, use of antistatic resins polyether ester amide resins, which are copolymers of a polyether component with a polyamide component, promises a good compatibility with belt extrusion resins and also can ensure uniform electrical resistance.

Figure 1:
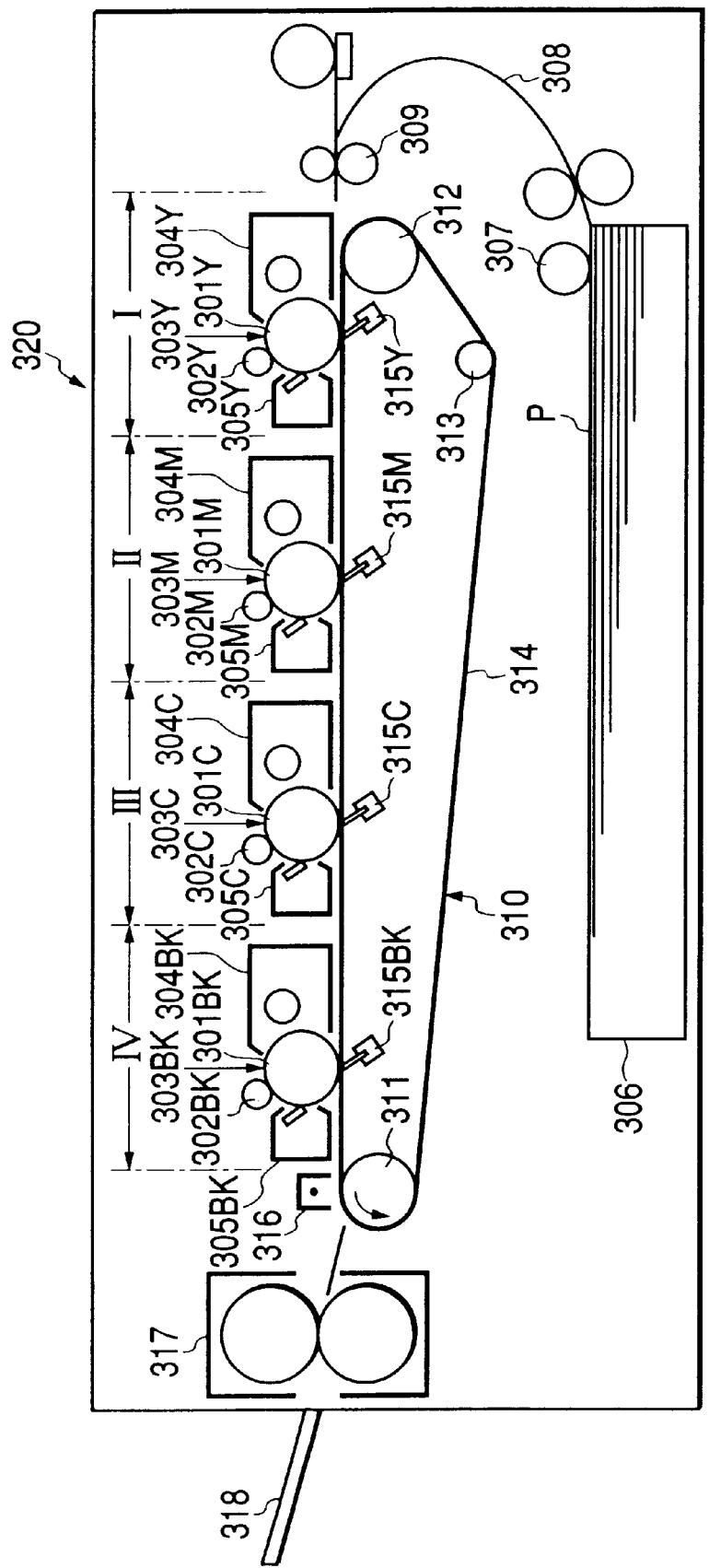
FIG. 1 schematically illustrates an example of an image-forming apparatus of the present invention, making use of a transfer belt as the transfer member.

An example of an image-forming apparatus employing the transfer member of the present invention as a transfer belt is schematically shown in FIG. 1.

The image-forming apparatus shown in FIG. 1 comprises, as electrophotographic processing means, four image-forming sections I, II, III and IV arranged side by side at the upper part of an apparatus main body 320. The image-forming sections I, II, III and IV are respectively constituted of photosensitive drums 301Y, 301M, 301C and 301BK as first image-bearing members, primary charging rollers 302Y, 302M, 302C and 302BK as primary charging assemblies, exposure units 303Y, 303M, 303C and 303BK, developing assemblies 304Y, 304M, 304C and 304BK, and cleaners 305Y, 305M, 305C and 305BK. The developing assemblies 304Y, 304M, 304C and 304BK hold a yellow (Y) toner, a magenta (M) toner, a cyan (C) toner and a black (BK) toner, respectively.

A transfer assembly 310 is also provided at the lower part of the image-forming sections I to IV. The transfer assembly 310 is constituted of an endless transfer belt 314 of the present invention, passed about across a drive roller 311, a follower roller 312 and a tension roller 313, and transfer charging assemblies 315Y, 315M, 315C and 315BK provided opposingly to the photosensitive drums 301Y, 301M, 301C and 301BK of the image-forming sections I, II, III and IV, respectively.

Meanwhile, at the bottom of the apparatus main body 320, a cassette 306 is provided in which a multiple sheet of transfer materials P, the second image-bearing member, can superposingly be held as recording mediums. The transfer materials P held in the cassette 306 are sheet by sheet sent out by a paper feed roller 307, and are transported to a registration roller 309 through a transport guide 308.

A separation charging assembly 316 and a fixing assembly 317 are provided on the downstream side in the transport direction of the transfer material P in the apparatus main body 320, and a paper output tray 318 is installed on the outside of the apparatus main body 320.

Then, in the image-forming sections I, II, III and IV, the photosensitive drums 301Y, 301M, 301C and 301BK are rotatingly driven at a prescribed speed in the direction of an arrow shown in the drawing, and these are uniformly charged by means of the primary charging rollers 302Y, 302M, 302C and 302BK, respectively. The photosensitive drums 301Y, 301M, 301C and 301BK thus charged are exposed to light by means of the exposure units 303Y, 303M, 303C and 303BK, respectively, in accordance with image information, whereupon electrostatic latent images are formed on the respective photosensitive drums 301Y, 301M, 301C and 301BK. The electrostatic latent images are developed by means of the developing assemblies 304Y, 304M, 304C and 304BK to become visible images as a yellow toner image, a magenta toner image, a cyan toner image and a black toner image, respectively.

Meanwhile, the transfer material P transported to the registration roller 309 from the cassette 306 through the transport guide 308 as described above is sent out to the transfer assembly 310 by the registration roller 309 under timing, and is then attracted to the transfer belt 314 and passed through the respective image-forming sections I, II, III and IV together with the belt, in the course of which the yellow toner image, the magenta toner image, the cyan toner image and the black toner image are superimposingly transferred to the transfer material P by the operation of the transfer charging assemblies 315Y, 315M, 315C and 315BK, respectively.

Then, the transfer material P to which the color toner images have been transferred as described above is destaticized by the separation charging assembly 316 to become separated from the transfer belt 314, and thereafter transported to the fixing assembly 317, where the color toner images are heat-fixed to form a full-color image. The transfer material P with the full-color image is finally put out of the apparatus main body 320, and overlaid on the paper output tray 318.

Figure 2:
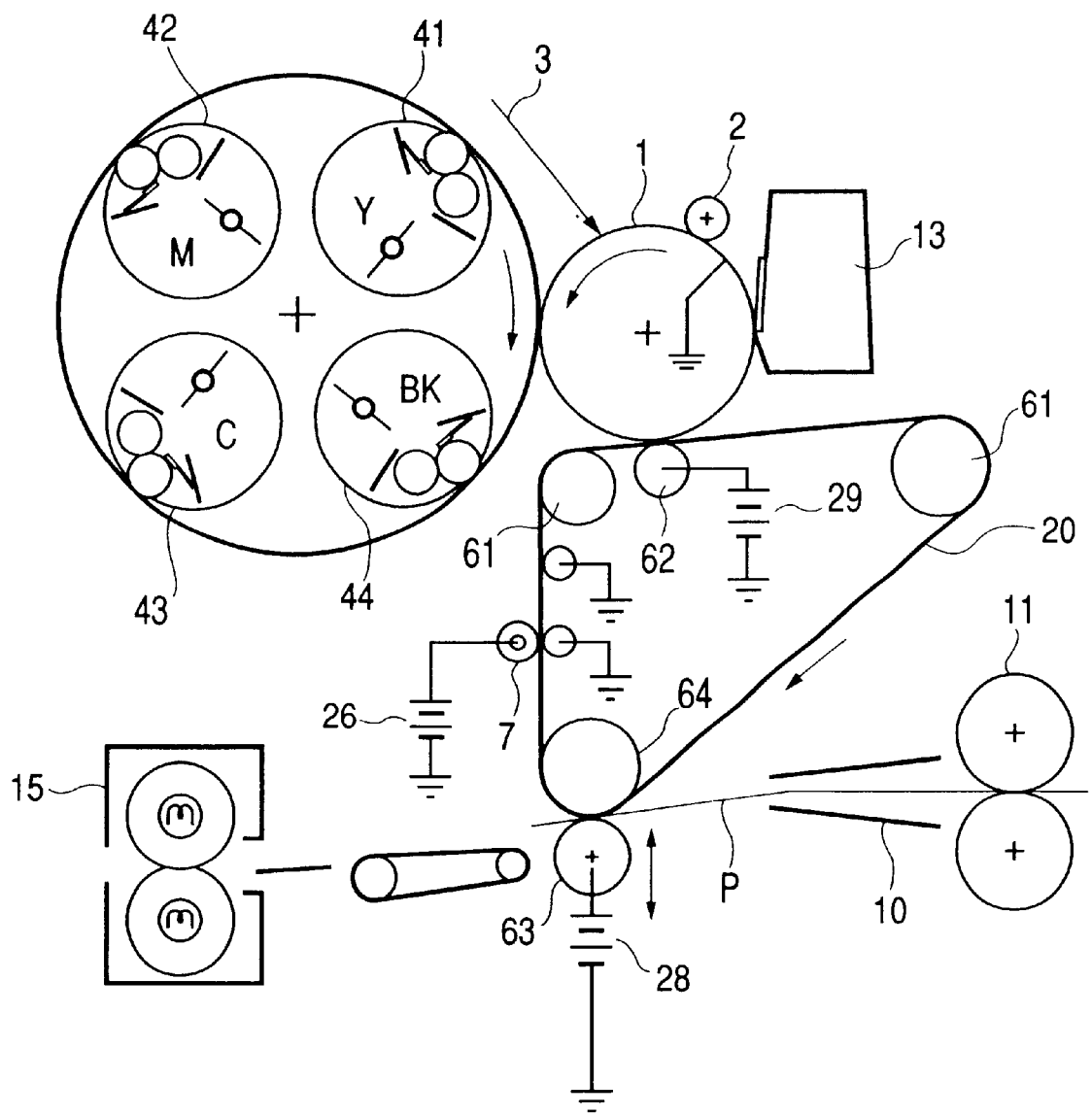
FIG. 2 schematically illustrates an example of an image-forming apparatus of the present invention, making use of an intermediate transfer belt as the transfer member.

Next, an example of an image-forming apparatus employing the transfer member of the present invention as an intermediate transfer belt is schematically shown in FIG. 2.

The apparatus shown in FIG. 2 is a full-color image-forming apparatus (copying machine or laser beam printer) utilizing an electrophotographic process. A medium-resistance seamless belt is used as an intermediate transfer belt 20.

An electrophotographic photosensitive member (hereinafter "photosensitive drum") 1 serving as a first image-bearing member is rotatingly driven at a prescribed peripheral speed (process speed) in the direction of an arrow.

The photosensitive drum 1 is, in the course of its rotation, uniformly charged to prescribed polarity and potential by means of a primary charging assembly 2, and then exposed to light 3 by an exposure means (not shown; e.g., a color-original image color-separating/image-forming optical system, or a scanning exposure system comprising a laser scanner that outputs laser beams modulated in accordance with time-sequential electrical digital pixel signals of image information). Thus, an electrostatic latent image is formed which corresponds to a first color component image (e.g., a yellow color component image) of the intended color image.

Next, the electrostatic latent image is developed with a first-color, yellow toner Y, by means of a first developing assembly (yellow color developing assembly 41). At this stage, second to fourth developing assemblies (magenta color developing assembly 42, cyan color developing assembly 43 and black color developing assembly 44) each stand unoperated and do not act on the photosensitive drum 1, and hence the first-color yellow toner image is not affected by the second to fourth developing assemblies.

The intermediate transfer belt 20 is rotatingly driven at a prescribed peripheral speed in the direction of an arrow.

The first-color yellow toner image formed and held on the photosensitive drum 1 passes through a contact zone formed between the photosensitive drum 1 and the intermediate transfer belt 20, in the course of which it is successively intermediately transferred to the periphery of the intermediate transfer belt 20 (primary transfer) by the aid of an electric field formed by a primary transfer bias applied to the intermediate transfer belt 20 through a primary transfer roller 62. The photosensitive drum 1 surface from which the first-color yellow toner image has been transferred is cleaned by a cleaning assembly 13.

Subsequently, the second-color magenta toner image, the third-color cyan toner image and the fourth-color black toner image are sequentially similarly transferred superimposingly onto the intermediate transfer belt 20. Thus, the intended full-color toner images are formed.

Reference numeral 63 denotes a secondary transfer roller, which is provided in such a way that it is axially supported in parallel with a secondary transfer opposing roller 64 and stands separable from the bottom surface of the intermediate transfer belt 20.

The primary transfer bias for sequentially superimposingly transferring the first- to fourth-color toner images from the photosensitive drum 1 to the intermediate transfer belt 20 is applied from a bias source 29 in a polarity (+) reverse to that of each toner. The voltage thus applied is, e.g., in the range of from +100 V to +2 kV.

In the step of primary transfer, the secondary transfer roller 63 may also be set separable from the intermediate transfer belt 20.

The full-color toner images formed on the intermediate transfer belt 20 are transferred (secondary transfer) to a second image bearing member, transfer material P, in the following way: The secondary transfer roller 63 is brought into contact with the intermediate transfer belt 20 and simultaneously the transfer material P is fed at a prescribed timing from a paper feed roller 11 through a transfer material guide 10 until it reaches a contact zone formed between the intermediate transfer belt 20 and the secondary transfer roller 63, where a secondary transfer bias is applied to the secondary transfer roller 63 from a power source 28. The transfer material P to which the toner images have been transferred are guided into a fixing assembly 15 and are heat-fixed there, thus a final full-color image is formed.

After the toner images have been transferred to the transfer material P, a charging member 7 for cleaning is brought into contact with the intermediate transfer belt 20, and a bias with a polarity reverse to that of the photosensitive drum 1 is applied, whereupon electric charges with a polarity reverse to that of the photosensitive drum 1 are imparted to toners not transferred to the transfer material P and remaining on the intermediate transfer belt 20 (i.e., transfer residual toners). Reference numeral 26 denotes a bias power source.

The transfer residual toners are electrostatically transferred to the photosensitive drum 1 at the contact zone between the photosensitive drum 1 and the intermediate transfer belt 20, and the vicinity thereof, thus the transfer residual toners are removed from the intermediate transfer belt.

There are no particular limitations on the first image-bearing member, the second image-bearing member, and also the charging means, the exposure means, the developing means, the cleaning means and so forth which are used in the present invention. As the first image-bearing member, however, a photosensitive drum containing fine powder of polytetrafluoroethylene (PTFE) in at least its outermost layer may preferably be used because a higher primary transfer efficiency can be achieved. This is presumably because the incorporation of PTFE lowers surface energy of the photosensitive drum outermost layer to bring about an improvement in releasability of the toner.

EXAMPLES

The present invention will be described below in detail by giving Examples. In the following Examples, "part(s)" is expressed by weight.

Example 1

Polyvinylidene fluoride resin 100 parts
Polyether ester amide resin which is a block copolymer of a polyamide component comprised of ε-caprolactum and adipic acid and a polyether component comprised of polyethylene glycol 18 parts The above materials were kneaded by means of a twin-screw extrusion kneader to make the resins melt together sufficiently to become dispersed uniformly, thus an extrusion material (1) made into pellets of 1 to 2 mm diameter was obtained.

Next, the above kneaded product was put into the hopper 120 of the single-screw extruder 100 shown in FIG. 3, and was extruded with heating to form a melt. The melt was subsequently brought to a single-layer extruding circular die 140 of 100 mm in die external diameter and 1,000 μm in die gap. The melt ejected from the die leading end was at an ejection rate of 5 m/min. Then, air was blown from the gas inlet passage 150 while the melt was extruded from the die, to scale-up inflate the extruded product into a cylindrical film. An intermediate transfer belt (1) was obtained while the circumference of the cylindrical film was measured and the feed of the gas was controlled in accordance with the information obtained (controlled once per minute), using a peripheral length measuring assembly integrally having the three constituents, a peripheral length measuring section having the laser light-projecting part 192 and its light-receiving part 191, the data processor 193 and the gas control unit 194 as shown in FIGS. 3 and 8. The intermediate transfer belt (1) had dimensions of an external diameter of 170±0.13 mm (circumference: 533.8±0.41 mm), a width of 320 mm and a wall thickness of 100±7 μm, which were kept within the desired ranges. Also, the difference in peripheral length at the right-and-left open edges was 0.5 mm.

Figure 9:
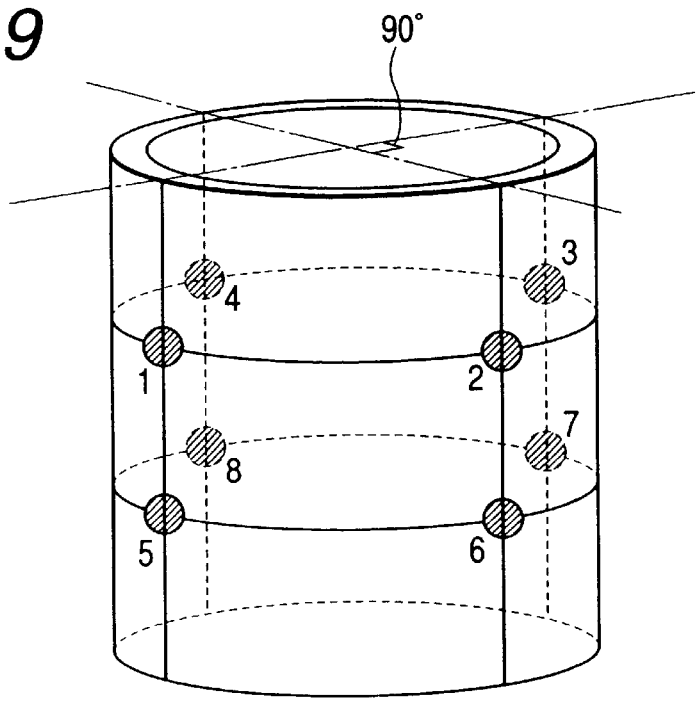
FIG. 9 schematically illustrates positions at which electrical resistance of a transfer belt is measured.

The electrical resistance of the intermediate transfer belt (1) was $7.4 \times 10^{10}$ Ω. Also, using the electrical resistance measuring instrument described previously, a voltage of 100 V was applied to measure the electrical resistance of the intermediate transfer belt (1) at four spots in its peripheral direction and at two spots in its axial direction at each position of the former, eight spots in total, as shown in FIG. 9, and any scattering of surface resistance and volume resistance in the belt was examined. The surface resistance and volume resistance at the eight spots for the measurement were $1.1 \times 10^{10}$ to $3.8 \times 10^{11}$ Ω/square and $5.1 \times 10^{10}$ to $6.0 \times 10^{11}$ Ω·cm, respectively. Thus, the scattering of measurements at the eight spots was within two figures (within 100 times).

Upon visual inspection of the intermediate transfer belt (1), none of foreign matter or faulty extrusion such as granular structure and fish eyes was seen on its surface. Also, the water absorption of the extrusion material (1) was 0.21%, and the water absorption of the intermediate transfer belt (1) was 0.05%.

This intermediate transfer belt (1) was set in the full-color electrophotographic apparatus shown in FIG. 2, and full-color images were printed on 80 g/m² paper to measure transfer efficiencies; the transfer efficiencies being defined as follows:

Primary transfer efficiency (efficiency of transfer from photosensitive drum to intermediate transfer belt)=(toner image density on intermediate transfer belt)/(transfer residual toner image density on photosensitive drum+toner image density on intermediate transfer belt)

Secondary transfer efficiency (efficiency of transfer from intermediate transfer belt to paper)=(image density on paper)/(image density on paper+transfer residual toner image density on intermediate transfer belt)

In the present Example, an organic photosensitive drum (OPC photosensitive drum) the outermost layer of which contained PTFE fine powder was used as the photosensitive drum 1. Hence, a higher primary transfer efficiency was attained. The primary transfer efficiency and the secondary transfer efficiency were 96% and 93%, respectively.

The intermediate transfer belt was cleaned by a cleaning-at-primary-transfer method in which an elastic roller having a resistance of $1 \times 10^8$ Ω was used as the charging member for cleaning, where full-color images were continuously printed on 50,000 sheets.

As a result, the belt was driven showing a smooth movement without causing faulty movement ascribable to uneven peripheral length, and good images were obtained from the beginning without causing any uneven image density ascribable to non-uniform electrical resistance of the belt, and without causing any color misregistration or faulty cleaning ascribable to uneven peripheral length or elongation set of the belt even after the running test on 50,000-sheet repeated service. Moreover, any filming of toner did not occur on the belt surface and the same surface properties as the initial ones remained unchanged without causing any crazing, scrape and wear.

Example 2

| | |
|---|---|
| Polycarbonate resin | 100 parts |
| Conductive carbon | 10 parts |
| Stearic acid monoglyceride | 1 part |

The above materials were kneaded by means of a twin-screw extrusion kneader, and the additive such as carbon was well uniformly dispersed in the resins, thus an extrusion material (2) was obtained. This material was further made into a kneaded product having grain diameters of 1 to 2 mm.

Next, the above kneaded product was put into the hopper 120 of the single-screw extruder 100 shown in FIG. 3, and was extruded controlling its preset temperature in the range of from 240 to 380° C., to form a melt. The melt was subsequently brought to an single-layer extruding circular die 140 of 200 mm in die external diameter and 1,000 $\mu$m in die gap. The melt ejected from the die leading end was at an ejection rate of 1 m/min. Then, air was blown from the gas inlet passage 150 while the melt was extruded from the die, to scale-up inflate the extruded product into a cylindrical film.

In the same manner as in Example 1, the circumference of the cylindrical film was measured, the information obtained was fed back to the gas control unit 194 and the pressure of the gas to be fed was controlled to control the circumference (controlled once per 2 minutes). Extrusion/forming was carried out in this way to finally obtain a transfer belt 190 having an external diameter of 290±0.19 mm (circumference: 910.6±0.6 mm), a width of 315 mm, a wall thickness of 100±5 $\mu$m and a difference in peripheral length at the right-and-left open edges, of 0.5 mm. This is designated as a transfer belt (1).

The electrical resistance of this transfer belt (1) was $2.3 \times 10^{10}$ $\Omega$. Also, the values of surface resistance at eight spots in the transfer belt, shown in FIG. 9, were values within the range of from $8.7 \times 10^{10}$ to $6.3 \times 10^{11}$ $\Omega$/square. The values of volume resistance at eight spots were also values within the range of from $9.0 \times 10^{9}$ to $7.5 \times 10^{10}$ $\Omega$·cm. Thus, the scattering of measurements was within one figure.

Upon visual inspection of the transfer belt (1), none of foreign matter or faulty extrusion such as granular structure and fish eyes was seen on its surface. Also, the water absorption of the extrusion material (2) and that of the transfer belt (1) were 0.18% and 0.06%, respectively.

Next, image quality and running performance were evaluated using the full-color electrophotographic apparatus shown in FIG. 1.

In the present Example, an organic photosensitive drum (OPC photosensitive drum) the outermost layer of which contained PTFE fine powder was used as the photosensitive drum 1. As the result, a high transfer efficiency of 92% was attained.

Good images were also obtained from the beginning without any abnormal travel caused by any uneven peripheral length of the belt and also without causing neither faulty transfer nor faulty cleaning due to uneven electrical resistance of the belt after the running test on 50,000 sheets. Moreover, any filming of toner did not occur on the belt surface, which might be due to transfer belt surface contamination caused during the running test, and the same surface properties as the initial ones remained unchanged without causing any crazing, scrape and wear. Also, with regard to color misregistration here, it was kept within 120 $\mu$m during the running.

Example 3

Intermediate transfer belts were produced in the same manner as in Example 1 except that the feed of the air was varied so that the extrusion/forming ratio was kept at 3.8 and the peripheral length of the intermediate transfer belt came to be 533.8 mm like that in Example 1 and within a peripheral length error of ±0.8 mm. Evaluation was also made similarly.

In Example 1, 95% or more of 10,000 belts formed had a peripheral length of 533.8 mm with an error within ±0.41 mm, whereas, in the present Example, though all within the desired ±0.8 mm, 85% of them were within ±0.41 mm.

Example 4

Intermediate transfer belts were produced in the same manner as in Example 1 except that the feed of the air was varied so that the extrusion/forming ratio was kept at 1.02 and the peripheral length of the intermediate transfer belt came to be 533.8 mm like that in Example 1 and within a peripheral length error of ±0.8 mm. Evaluation was also made similarly.

As the result, among 10,000 belts formed, though all within the desired ±0.8 mm, 80% of them were within ±0.41 mm, and 90% of them were within ±0.6 mm.

Example 5

Intermediate transfer belts were produced in the same manner as in Example 1 except that the circular die of the extruder was changed so that the thickness/die gap was kept at 99/100 and the peripheral length of the intermediate transfer belt came to be 533.8 mm like that in Example 1 and within a peripheral length error of ±0.8 mm. Evaluation was also made similarly.

As the result, among 10,000 belts formed, though all within the desired ±0.8 mm, only 70% of them were within ±0.50 mm.

Comparative Example 1

The procedure of Example 1 was repeated to carry out extrusion/forming except that the laser light-projecting part 192, the light-receiving part 191, the data processor 193 and the gas control unit 194, shown in FIGS. 3 and 8, were not provided. Thus, an intermediate transfer belt (2) of 170 mm in diameter as shape size was obtained. It was intended for the intermediate transfer belt (2) to have a peripheral length of 533.8 mm for the time being, which, however, deflected between the minimum value of 532.1 mm and the maximum value of 535.81, i.e., in an extent beyond ±1.5 mm.

A copying test was made in the same manner as in Example 1, where color misregistration presumed to be due to uneven peripheral length occurred partly, which was color misregistration of 180 $\mu$m on the average, but even color misregistration of 250 $\mu$m occurred suddenly occasionally from the beginning. Running was also made on 50,000 sheets, where the color misregistration became gradually more serious than the initial level. Moreover, the meandering of the belt during travel became greater with progress of running.

What is claimed is:

1. A process for producing a transfer member to be used in a transfer system by which a toner image formed on a first image-bearing member is transferred to a second image-bearing member, the process comprising the steps of;

melt-extruding an extrusion material from a circular die of an extrusion/forming apparatus into a cylindrical film; and measuring a circumference of the cylindrical film and sending the resultant information to the extrusion/forming apparatus to adjust a circumference of the cylindrical film, wherein the extrusion material has a water absorption of 1.9% or less.

2. A process according to claim 1, wherein a value found by dividing an external diameter of the cylindrical film after extrusion/forming by the external diameter of the circular die is in the range of 0.5 to 3.0.

3. A process according to claim 1, wherein a value found by dividing an external diameter of the cylindrical film after extrusion/forming by the external diameter of the circular die is in the range of 1.05 to 25 3.0.

4. A process according to claim 1, wherein a value found by dividing a wall thickness of the cylindrical film after extrusion/forming by the die gap size of the circular die is in the range of 99/100 to 1/100.

5. A process according to claim 1, wherein the resultant information is sent to the extrusion/forming apparatus at an interval in the range of once per 30 seconds to once per five minutes.

6. A process according to claim 1, wherein the cylindrical film is stretched by blowing a gas to an inside of the cylindrical film being extruded from the circular die.

7. A process according to claim 6, wherein a circumference of the cylindrical film is adjusted by controlling at least one of a supply of the gas and a pressure of the gas.

8. A process according to claim 1, wherein a circumference of the cylindrical film is measured using laser light provided as a light source for measurement.

9. A process according to claim 1, wherein the extrusion material is extruded from the circular die at an ejection rate in the range of 1 m/minute to 20 m/minute.

10. A transfer member to be used in a transfer system by which a toner image formed on a first image-bearing member is transferred to a second image-bearing member, the transfer member comprising a cylindrical film obtained by;

melt-extruding an extrusion material from a circular die of an extrusion/forming apparatus into a cylindrical film; and measuring a circumference of the cylindrical film and sending the resultant information to the extrusion/forming apparatus to adjust the circumference of the cylindrical film, wherein said extrusion material has a water absorption of 1.9% or less.

11. A transfer member according to claim 10, wherein a value found by dividing an external diameter of said cylindrical film after extrusion/forming by the external diamater of the circular die is in the range of 0.5 to 3.0.

12. A transfer member according to claim 10, wherein a value found by dividing an external diameter of said cylindrical film after extrusion/forming by the external diameter of the circular die is in the range of 1.05 to 3.0.

13. A transfer member according to claim 10, wherein a value found by dividing the wall thickness of said cylindrical film after extrusion/forming by a die gap size of the circular die is in the range of 99/100 to 1/100.

14. A transfer member according to claim 10, wherein the resultant information is sent to the extrusion/forming apparatus at an interval in the range of once per 30 seconds to once per five minutes.

15. A transfer member according to claim 10, wherein said cylindrical film is stretched by blowing a gas to an inside of said cylindrical film being extruded from the circular die.

16. A transfer member according to claim 15, wherein a circumference of said cylindrical film is adjusted by controlling at least one of a supply of the gas and a pressure of the gas.

17. A transfer member according to claim 10, wherein the circumference of said cylindrical film is measured using laser light provided as a light source for measurement.

18. A transfer member according to claim 10, wherein said extrusion material is extruded from the circular die at an ejection rate in the range of 1 m/minute to 20 m/minute.

19. A transfer member according to claim 10, which has a volume resistance in the range of $1 \times 10^0$ $\Omega$·cm to $1 \times \Omega$·cm.

20. A transfer member according to claim 19, wherein a maximum value of the volume resistance is within 100 times a minimum value thereof.

21. A transfer member according to claim 10, which has a surface resistance in the range of $1 \times 10^0$ $\Omega$/square to $1 \times 10^0$ $\Omega$/square to $1 \times 10^{17}$ $\Omega$/square.

22. A transfer member according to claim 21, wherein a maximum value of the surface resistance is within 100 times of a minimum value thereof.

23. A transfer member according to claim 10, which has a measured peripheral length within ±0.8 mm of a desired length thereof.

24. A transfer member according to claim 10, which has open edges with a difference in peripheral length thereof within 1.5 mm.

25. A transfer member according to claim 10, which has a wall thickness in the range of 45 $\mu$m to 300 $\mu$m.

26. A transfer member according to claim 25, wherein the wall thickness has a scattering within ±13% of an average value thereof.

27. An image-forming apparatus which includes a transfer system by which a toner image formed on a first image-bearing member is transferred to a second image-bearing member by means of a transfer member; the transfer member comprising the transfer member according to any one of claim 10 to 26.

* * * * *

UNITED STATES PATENT AND TRADEMARK OFFICE
CERTIFICATE OF CORRECTION

PATENT NO.    : 6,470,165 B2
DATED         : October 22, 2002
INVENTOR(S)   : Hiroyuki Kobayashi It is certified that error appears in the above-identified patent and that said Letters Patent is hereby corrected as shown below:

Column 2,
Line 46, "enlarges the" should read -- results in an increased --.

Column 3,
Line 4, "undergo" should read -- undergoes --.

Column 6,
Line 33, "cooled in the state" should read -- cooled in a state when --.

Column 8,
Line 32, ""long","" should read -- "long", --.

Column 9,
Line 31, "neither" should read -- either --.
Line 32, "nor" should read -- or --.

Column 11,
Line 18, "may" should read -- may be --.

Column 14,
Line 48, "numberal" should read -- numeral --.

Column 15,
Line 46, "ε-caprolactum" should read -- ε-caprolactam --.

Column 17,
Line 17, "an" should read -- a --.

Column 18,
Line 64, "of;" should read -- of: --.

UNITED STATES PATENT AND TRADEMARK OFFICE
CERTIFICATE OF CORRECTION

PATENT NO.   : 6,470,165 B2
DATED        : October 22, 2002
INVENTOR(S)  : Hiroyuki Kobayashi It is certified that error appears in the above-identified patent and that said Letters Patent is hereby corrected as shown below:

Column 20,
Line 30, "$1\times10^0$" (second occurrence) should be deleted.
Line 31, "$\Omega$/square to" should be deleted.
Line 51, "claim 10" should read -- claims 10 --.

Signed and Sealed this

Tenth Day of June, 2003

JAMES E. ROGAN
*Director of the United States Patent and Trademark Office*